United States Patent
Funk et al.

(10) Patent No.: US 7,126,491 B2
(45) Date of Patent: Oct. 24, 2006

(54) METHOD AND APPARATUS FOR INDICATION OF APPLICATION LAYER CONNECTIVITY

(75) Inventors: James M. Funk, Menlo Park, CA (US); Steve Shannon, Hillsborough, CA (US)

(73) Assignee: Akimbo Systems Inc., San Mateo, CA (US)

( * ) Notice: Subject to any disclaimer, the term of this patent is extended or adjusted under 35 U.S.C. 154(b) by 134 days.

(21) Appl. No.: 10/968,198

(22) Filed: Oct. 18, 2004

(65) Prior Publication Data

US 2006/0082467 A1    Apr. 20, 2006

(51) Int. Cl.
*G08B 5/22* (2006.01)
(52) U.S. Cl. ............................ 340/815.45; 340/691.6; 717/178
(58) Field of Classification Search .......... 340/815.45, 340/691.1, 691.4, 691.6, 500; 709/224, 203, 709/217, 218, 219; 717/125, 173, 177, 178
See application file for complete search history.

(56) References Cited

U.S. PATENT DOCUMENTS

| | | | | |
|---|---|---|---|---|
| 6,047,327 A | * | 4/2000 | Tso et al. | 709/232 |
| 6,237,039 B1 | * | 5/2001 | Perlman | 709/237 |
| 6,639,687 B1 | * | 10/2003 | Neilsen | 358/1.14 |
| 6,802,061 B1 | * | 10/2004 | Parthasarathy et al. | 717/173 |
| 7,030,737 B1 | * | 4/2006 | Dove et al. | 340/331 |
| 2002/0174223 A1 | * | 11/2002 | Childers et al. | 709/224 |
| 2004/0164166 A1 | * | 8/2004 | Mahany et al. | 235/472.02 |
| 2005/0040964 A1 | * | 2/2005 | Thomas | 340/815.45 |

* cited by examiner

*Primary Examiner*—Toan N. Pham
(74) *Attorney, Agent, or Firm*—Sonnenschein Nath Rosenthal LLP

(57) ABSTRACT

A display indicator is provided on a set-top appliance to indicate application layer connectivity between a client device and a server belonging to a hosted service. This connectivity optionally reflects synchronization state of a service related database on the appliance and its replica on the server. A second indicator on the appliance displays the completion status of an ongoing download.

20 Claims, 3 Drawing Sheets

METHOD AND APPARATUS FOR INDICATION OF APPLICATION LAYER CONNECTIVITY

BACKGROUND OF THE INVENTION

1. Field of Invention

The invention relates generally to the fields of video on demand (VOD) and set-top appliances. In particular, the invention relates to providing visual indications on a set-top appliance to indicate application layer connectivity and completion status of content download between the set-top appliance and a VOD service.

2. Description of Related Technology

With the recent advances in computing, storage and telecommunications technologies, the ability to download and watch audio/video content over a network connection is opening up new opportunities to deploy VOD services. For example, in a download-and-view VOD service, users can access content over the Internet, download it to a local storage device and view the content at a later time. One architectural element of such a service is a client device with local storage that downloads content from network servers.

Need to Display Download Progress

In co-pending U.S. patent application Ser. No. 10/928,451 entitled "Method and apparatus for downloading content" filed Aug. 27, 2004, assigned to the assignee of the present invention and incorporated herein by reference, a method is disclosed for downloading content from servers of a download-and-view VOD service to a client device. This method includes a software download manager executed on a client device to prioritize and manage download tasks of multiple download requests.

The download manager described in this reference performs content download by prioritizing such operations from a work list of all download requests. Some work items from this list may be of immediate interest to a user (e.g., the user may want to watch the program as soon as the download is finished and therefore may want a notification of completion of download).

When a VOD client device is connected to a television display, such notification may require either displaying messages on the television screen or a user having to invoke a "status" screen on the client device (via for example a remote control) and check from time to time on the progress of the download. Both these methods are inconvenient or disruptive to a user's viewing of another program. The first method further is limited in that if the television is turned off, a visual indicator of download completion cannot be displayed to the user.

Need to Display Connectivity

In co-pending U.S. patent application Ser. No. 10/966,403 entitled "Method and apparatus for management of video on demand client device" filed Oct. 14, 2004, assigned to the assignee of the present invention and incorporated herein by reference, a method is disclosed for the management of content stored on a VOD client device in multiple ways— direct interaction with the client device and/or interaction with a replica dataset of the client device parameters stored on a network server. An implementation of the method includes download manager software running on a client device that is in periodic communication with a corresponding network-side server. This periodic communication is important to maintain synchronization between a client device's local content database and a replica thereof maintained on the VOD service provider's server.

For reasons such as ensuring proper operation of the client device, maintaining user satisfaction with the service, effective customer support and so on, it is important for the user to know that the content management application running on the client device is in communication with the corresponding server side software agent. A visual indication of such connection without the user having to either turn on or tune away his/her television is important.

Conventional solutions have recognized the need to display connectivity of networked devices at a physical layer level. For example, many cable modems have LEDs indicating the presence of a cable signal. Similarly many network devices with an Ethernet jack have a connectivity light that indicates the presence of an Ethernet carrier. Similarly, blinking lights that represent data traffic are provided on many devices to indicate active network communication.

However, the present inventors have recognized that such techniques fall short of the need for a download-and-view VOD client device as discussed above where is the requirement is to show not presence or absence of carrier signal or data traffic (i.e., physical layer connectivity), but an application layer connection with a server-side application ensuring the synchronization of the states of the client-side and the server-side components.

Thus, described herein are methods and apparatus to display such application layer connectivity that includes mechanisms to reflect synchronization of states of the client and server side components and to reflect the current download status of multimedia content. Such techniques preferably provide visual feedback of the status of connectivity and content download without a user having to turn on the television, tune away from a program being viewed, or having to view an overlay on an existing program.

SUMMARY OF THE INVENTION

The present invention addresses the foregoing needs by providing, in various embodiments, a method and apparatus for display of application layer connectivity. In one embodiment, a front panel display for a set-top appliance has two indicators. The first indicator is configured to reflect application layer connectivity status between a content management system executing on the set-top appliance and a hosted service through which information regarding multimedia content available for download to a computer readable medium of the set-top appliance can be obtained. The second indicator is configured to reflect current download status of the multimedia content.

In a second aspect of the invention, a method to reflect the status of a current download of multimedia content by a set-top appliance via the Internet on a first indicator of a front panel display of the set-top appliance while at the same time reflecting a current application layer connectivity status between a content management application executing on the set-top appliance and a hosted service through which information regarding the multimedia content can be obtained on a second indicator of the front panel display is disclosed.

In a third aspect of the invention, an appliance having a first display configured to indicate application layer connectivity status between a content management system executing on the appliance and a hosted service through which information regarding multimedia content available for download to the appliance can be obtained; and a second display configured to reflect current download status of the multimedia content is disclosed.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which.

DETAILED DESCRIPTION

Figure 1:
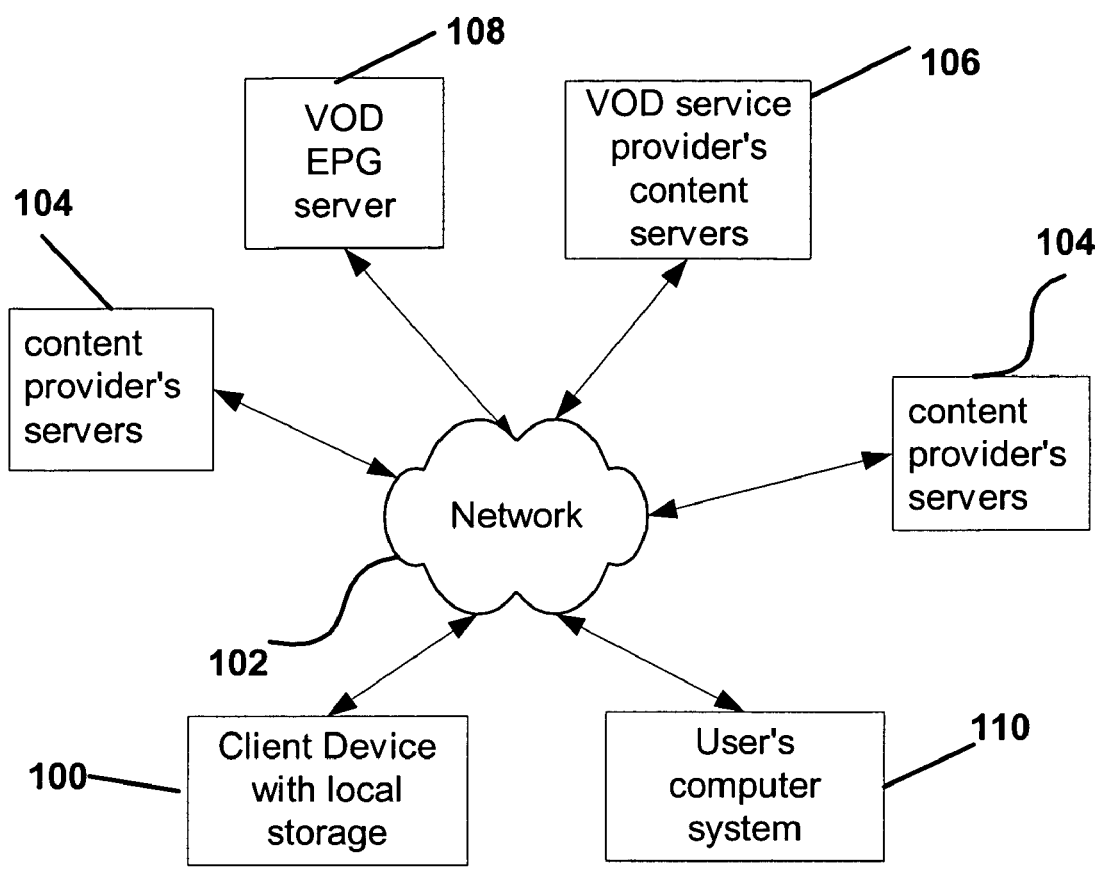
FIG. 1 illustrates an example of high-level system architecture of a download-and-view service network where an embodiment of the present invention can be implemented.

Reference is now made to the drawings wherein like numerals refer to like parts throughout. Described herein are improved methods and apparatus for indication of application layer connectivity and download progress. In one embodiment, a front panel display with connectivity and download progress indicator lights is disclosed.

As used herein, the term "VOD" is meant to include on-demand delivery of audio, video, graphical, software, computer games, etc.

As used herein, the term "VOD service provider" refers to a commercial entity that provides an end user a VOD service including the ability to browse through available program titles, download content of interest and view it. The VOD service provider can be any form of entity or an individual. In general, the VOD service provider need not be a network facilitator. For example, where the Internet is used as the distribution channel for the content, the VOD service provider need not be an Internet service provider, network operator or associated with any form of network infrastructure provision. Instead, the VOD service provider may operate one or more Internet hosts configured to provide the program guide described below and to facilitate the distribution of metadata regarding content available for download to end users thereof. Often, though not necessarily, the VOD service provider will operate Internet hosts from which the content is available for download, however, this is not critical to the present invention. The VOD service may make use of special or general purpose computer systems configured to download and display the Internet content using any of a variety of communication and presentation applications. The precise nature of such application programs and, indeed, the nature of the computer systems on which the content is played back is not critical to the present inventions except insofar as the discussion below indicates.

As used herein, the term "content" refers to audio, video, graphics files (in uncompressed or compressed format), icons, software, text files and scripts, data, binary files and other computer-usable data used to operate a client device and produce desired audio-visual effects on a client device for the viewer.

As used herein, the terms "computer method," "computer program", "routine," and "subroutine" are substantially synonymous, with "computer method" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the present invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

Overview

Download-and-View VOD

FIG. 1 shows an example deployment of a download-and-view VOD service deployment showing a client device with local storage capability (100). This client device is communicatively coupled with multiple servers via a network 102. These servers include the content provider's servers 104 (including, but not limited to, file transfer servers, licensing servers, web servers and so on), the VOD service provider's content servers 106 and the VOD service provider's one or more servers (108) on which an aggregated program guide (subject matter of this invention) is made available for download. Also shown in FIG. 1 is a computer system (110) such as a user's personal computer that is communicatively connected to the servers. Using this connection to the various servers, a VOD subscriber can perform one or more of same tasks that he/she can perform using the client device (e.g., but not limited to, content discovery, account management, etc.).

Application Layer Connectivity

In the client device management patent application referenced above, a method for reviewing titles and adding or deleting content stored locally on a client device by interacting (via a second computer system) with a replica of a database of the client device on a VOD service provider's network-side server is disclosed. In one step of the method, periodic synchronization is performed between the client device and the service provider's server. This periodic communication also could include the exchange of service management data such as a program guide and other provider-specific control messages. It should be evident that if this synchronization is lost over a long period of time, the entries in the database on the client device could be significantly different from the entries on the replica database on a network-side server. To avoid such discrepancies the periodic synchronization of these databases may be performed automatically and a method is provided to indicate to the user the connectivity between the client-side and the server-side application components.

Figure 2:
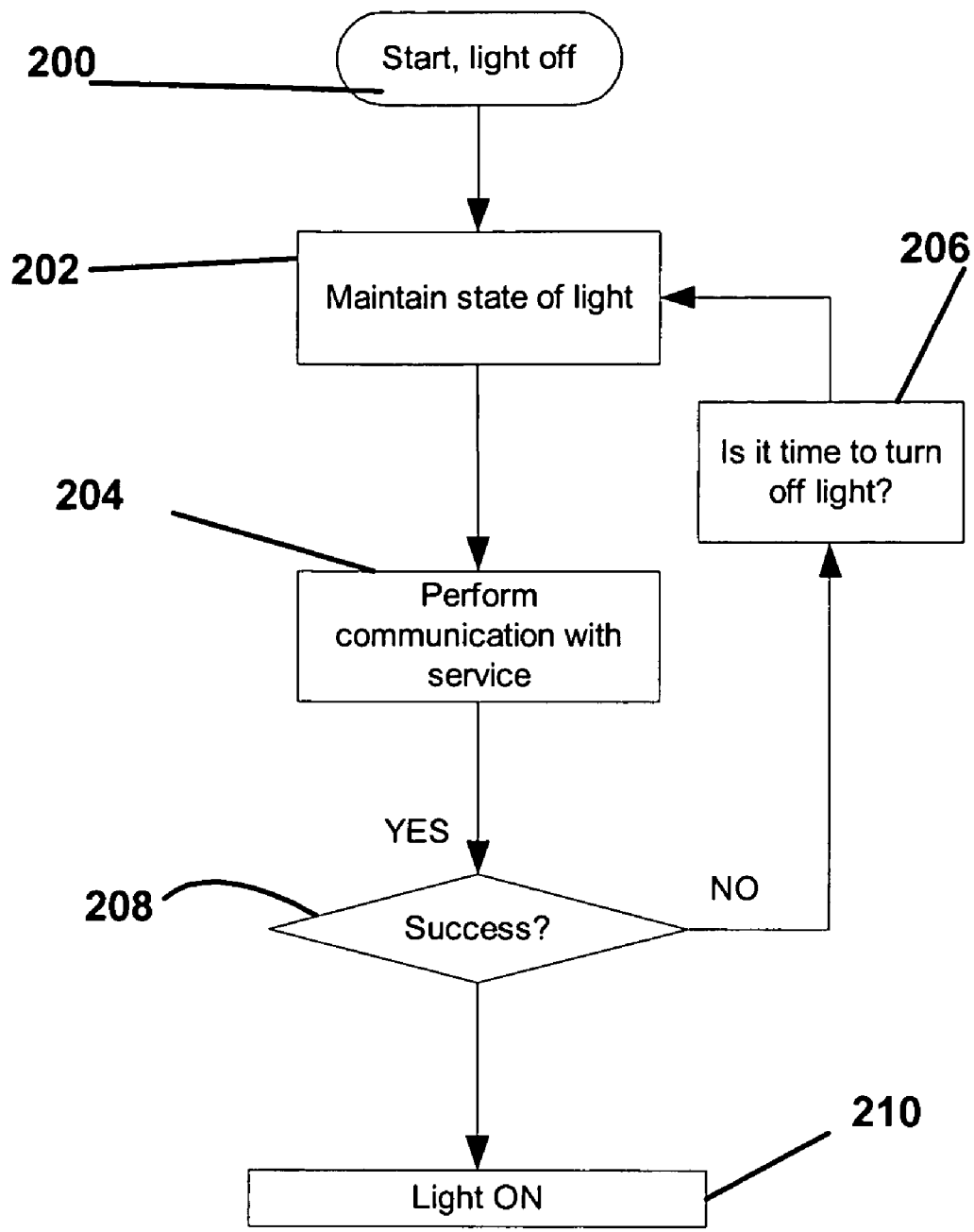
FIG. 2 illustrates processes of an algorithm to advise a user of current application layer connectivity between a set-top appliance and a hosted service (e.g., by lighting up a connectivity light associated with the set-top appliance) in accordance with an embodiment of the present invention.

In an exemplary embodiment of the present invention, after a client device powers up and before the initial communication with a VOD server is established, the application layer connectivity light (which, for example, may be located on the front panel of the client device if that device is a set-top appliance, or in another convenient location depending on the physical configuration of the client device) is turned off. This step (200) is shown in FIG. 2. The state of the display remains unchanged (202) until communication (204) occurs between the client device and a VOD server. At this time, if this communication is successful at the application layer (208), the connectivity light is turned on (or kept on, as the case might be). If the communication is not successful, a decision is taken regarding whether or not to turn off the connectivity light (206). Various implementations of this decision logic are possible. For example, in one embodiment the client device may react quickly, turning off the connectivity light as soon a communication error occurs. While in another embodiment, the light may be turned off only if the period of non-communication exceeds a threshold of some kind, such as a number of parameters missed during synchronization, a number of unsuccessful attempts to reestablish application layer communication, or the duration of the period of non-connectivity, and so on. If the outcome of such a decision process is that the connectivity has been lost, the indicator is turned off. Otherwise, the state of the connectivity light is maintained.

Based on the above discussion, it will be appreciated by practitioners of the art that depending on the implementation, the term "application layer connectivity" may indicate merely the ability to pass messages back and forth between two applications; one on a client device and the other on a server. Or, the term could imply a certain state of the client and server side applications, where one side knows the other side's state of logic, values of at least some parameters or entries in database managed by the applications and can reasonably predict near-future behavior of the software component on the other side.

It should be noted that it is possible to implement "reverse logic" of this application layer connectivity. Such a display would take on the meaning of "searching for application connectivity" and generally behave logical opposite to the application layer connectivity light described above (for example, the light will be off when application connectivity is established and on when such connectivity is absent).

Download Progress

The download manager described in the above-referenced patent application performs download of multimedia content and "housekeeping" content (e.g., software upgrades, system messages, etc.). Some implementations may include indicating the progress of downloading such housekeeping content on the download progress lights described herein, while other implementations may choose to only display the progress of multimedia or otherwise requested content downloads. At any given time, the download manager may be downloading data for more than one program title simultaneously. Various techniques can be implemented to display such multiple concurrent downloads. For example, in one embodiment, the display might show progress of the download that is closest to finishing while in another embodiment, the download progress of the title that is slowest to finish might be shown. In still other examples, multiple indicators may be used to reflect different downloads, or different colors of single, multi-color LEDs may be so employed. In still other examples, an alphanumeric or other form of display may provide specific information relating to the progress of each download in human-readable text and/or graphics.

Figure 3:
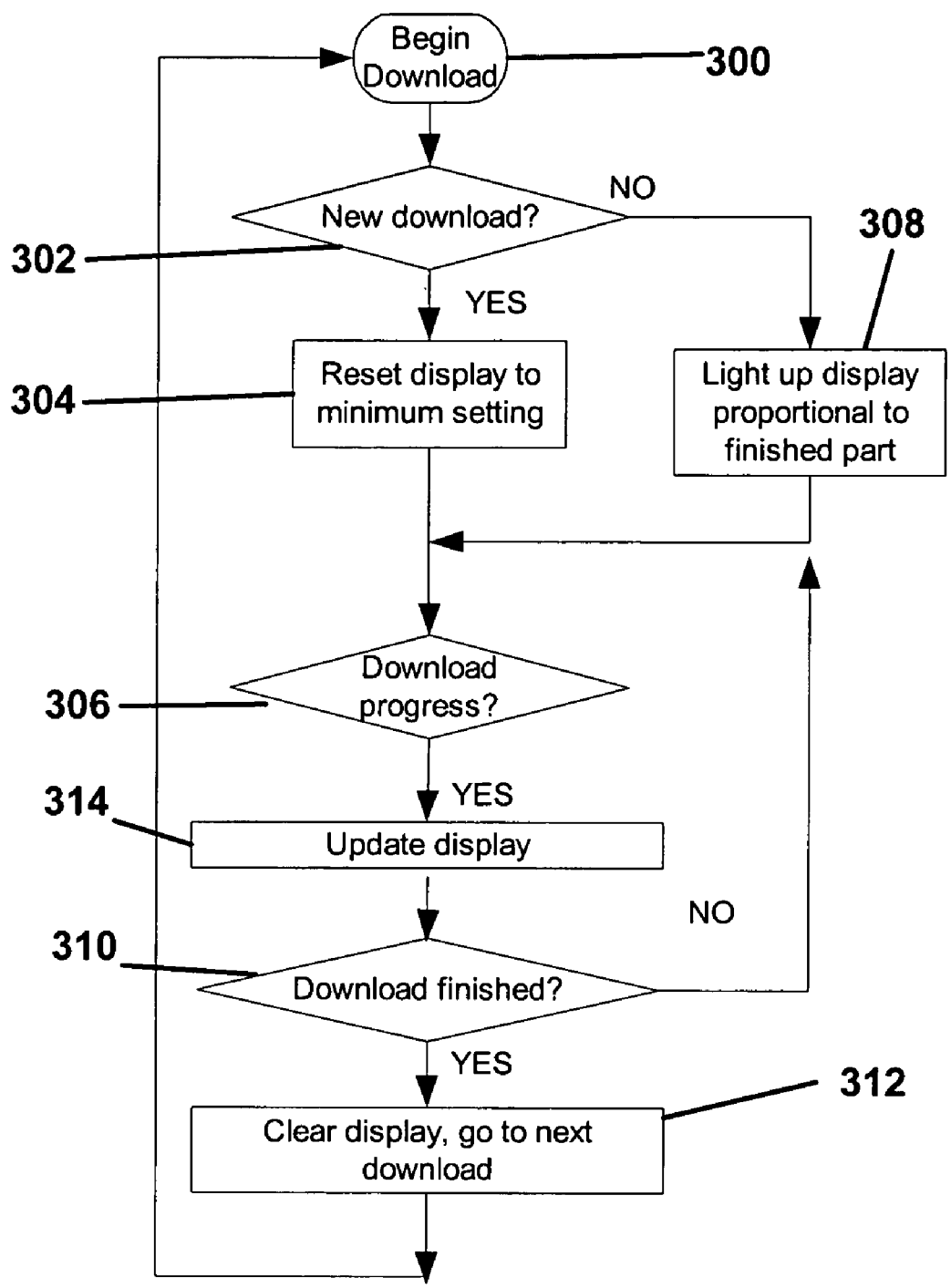
FIG. 3 shows algorithmic steps taken to indicate to a user (e.g., via an appropriate display) a current status of a download of content from a remote host, according to an embodiment of the present invention.

An example of an algorithm used to display download progress in a case where one content title is downloaded at a time is shown in FIG. 3. This technique may be easily expanded to cover any of the above-described scenarios. When the download manager begins a new download task (300), a check is made (302) to see if this is a new download item or a partially completed earlier download (that was paused perhaps to make way for a higher priority download). For new items, the download light is reset to correspond to "zero percent" or minimum setting (304) as the download begins. Thereafter, download progress is monitored (306) and the display kept up to date as appropriate for the download status. If step 302 indicates that the next download item is a previously unfinished download, a query is made regarding its previous download completion status and the display is lighted up in proportion to that status as the download begins (308). Afterwards, download progress is monitored (306) for further progress. A check is made periodically or after receiving some amount of data (310) to see if the download is completed. The display is modified to reflect download progress (314). If the download manager indicates that the download for the current item is finished (or paused to make way for another download to begin), the display is cleared in step 312 (reset to minimum state) and the logic resets to step 300 (beginning on a new download task). If the download is not finished in check in step 310, it is monitored for further progress.

In the embodiment described above, when download of one program is finished, a user will notice the light indicators changing from an "all complete" state to a state proportional to the next item's download status on the download work list. The user can then navigate through an on-screen display to determine which download was recently finished. In other embodiments, where the display indicator is more than a set of LEDs, such information may be obtained from the display without having to access an on-screen display.

It should be noted that it is possible to implement "reverse logic" of this download progress indication. Such a display would take on the meaning such as "amount yet to download" and generally behave logical opposite to the download progress lights described above. For example, at the beginning of a new download, all lights may be turned on indicating the entire program is remaining to be downloaded.

Display Mechanisms

Various forms of displays may be used to indicate download progress. For example, linearly arranged LEDs, percent indicator (numerical display), alphanumeric displays, liquid crystal displays, plasma monitors, etc. Generally, for an intuitive visual feedback to the user, it is advantageous to have a visual correlation between the amount (percentage) of data download finished and the amount of light sources lit up.

Although the methods and apparatus of the present invention have been described with reference to Internet Protocol-based networks it will be appreciated that the teachings are equally applicable to networks that use other transport protocols. It will be appreciated that while an embodiment using front panel LED display of a set-top appliance is described, placement of the light sources, whether or not LED or some other form of light sources are used and the specifics of physical properties such as color, size, shape of such display do not materially affect the present invention.

In the foregoing specification, the invention has been described with reference to specific exemplary embodiments thereof. It will, however, be evident to those of ordinary skill in the art that various modifications and changes may be made thereto without departing from the broader spirit and scope of the invention as set forth in the appended claims. The specification and drawings are, accordingly, to be regarded in an illustrative rather than a restrictive sense and that it is understood that the following claims including all equivalents are intended to define the scope of the invention.

What is claimed is:

1. A front panel display for a set-top appliance comprising: a first indicator configured to reflect application layer connectivity status between a content management system executing on the set-top appliance and a hosted service through which information regarding multimedia content available for download to a computer readable medium of the set-top appliance can be obtained; and a second indicator configured to reflect current download status of the multimedia content.

2. The front panel display of claim 1, wherein the second indicator comprises a series of light emitting diodes (LEDs).

3. The front panel display of claim 2, wherein the LEDs are arranged so as to resemble an arc from one area of the display to another area of the display.

4. The front panel display of claim 3, wherein the LEDs are configured to light up in such a way as to provide an approximate indication of a percentage of completion of the download status of the multimedia content.

5. The front panel display of claim 1, wherein the first indicator comprises a first light emitting diode (LED).

6. The front panel display of claim 5, wherein the second indicator comprises a group of LEDs which group does not include the first LED.

7. The front panel display of claim 5, wherein the first LED is a different color than the LEDs which make up the group of LEDs.

8. The front panel display of claim 7, wherein at least one of the LEDs which make up the group of LEDs is a different color than others of the group of LEDs.

9. The front panel display of claim 1, wherein the second indicator comprises an alphanumeric display.

10. A method, comprising reflecting a status of a current download of multimedia content by a set-top appliance via the Internet on a first indicator of a front panel display of the set-top appliance while at the same time reflecting a current application layer connectivity status between a content management application executing on the set-top appliance and a hosted service through which information regarding the multimedia content can be obtained on a second indicator of the front panel display.

11. The method of claim 10, wherein the status of the current download is reflected by lighting in succession a series of light emitting diodes (LEDs) which comprise the first indicator.

12. The method of claim 10, wherein the connectivity status between the content management application and the hosted service is reflected by lighting or not lighting a light emitting diode (LED).

13. An appliance, comprising a first display configured to indicate application layer connectivity status between a content management system executing on the appliance and a hosted service through which information regarding multimedia content available for download to the appliance can be obtained; and a second display configured to reflect current download status of the multimedia content.

14. The appliance of claim 13, wherein the first display comprises a light emitting diode (LED).

15. The appliance of claim 14, wherein the LED is blue.

16. The appliance of claim 13, wherein the second display comprises a series of light emitting diodes (LEDs).

17. The appliance of claim 16, wherein the second display comprises three LEDs.

18. The appliance of claim 17, wherein the three LEDs are arranged in an arc.

19. The appliance of claim 18, wherein at least one of the three LEDs is a different color than the others of the three LEDs.

20. The appliance of claim 13, wherein the second display is a different color than the first display.

* * * * *